(12) United States Patent
Riley

(10) Patent No.: US 6,451,411 B1
(45) Date of Patent: *Sep. 17, 2002

(54) WEATHERSEAL HAVING A SUBSTRATE WITH AN ADHESIVE OVERFLOW CONTAINMENT GROOVE

(75) Inventor: Steven Howard Riley, Maryville, TN (US)

(73) Assignee: Schlegel Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,196

(22) Filed: Sep. 8, 1999

(51) Int. Cl.⁷ .................................................. E06B 7/16
(52) U.S. Cl. ...................... 428/156; 428/167; 49/475.1; 49/489.1; 49/490.1; 49/495.1
(58) Field of Search ................................ 428/156, 167; 49/475.1, 489.1, 490.1, 495.1

(56) References Cited

U.S. PATENT DOCUMENTS

| | | | |
|---|---|---|---|
| 3,727,506 A | 4/1973 | Taylor et al. ................. 83/698 |
| 3,819,444 A | 6/1974 | Ungerer ..................... 156/25 C |
| 4,064,654 A | 12/1977 | Olson ........................... 49/489 |
| 4,418,956 A | 12/1983 | Yamamoto et al. ......... 296/216 |
| 4,582,738 A | 4/1986 | Kunert ......................... 428/80 |
| 4,783,931 A | 11/1988 | Kirkwood .................... 49/441 |
| 4,800,681 A | 1/1989 | Skillen et al. ................ 49/440 |
| 4,894,275 A | 1/1990 | Pelzer ......................... 428/166 |
| 4,894,289 A | 1/1990 | Otawa et al. ............ 428/424.2 |
| 4,969,293 A | 11/1990 | Guillon ........................ 49/441 |
| 4,969,294 A | 11/1990 | Guillon et al. ............... 49/495 |
| 5,005,317 A | 4/1991 | Saint-Louis Agustine .... 49/495 |
| 5,151,307 A | 9/1992 | Jackson ......................... 428/31 |
| 5,183,613 A | 2/1993 | Edwards ..................... 264/171 |
| 5,283,100 A | 2/1994 | Yui et al. .................... 428/120 |
| 5,302,463 A * | 4/1994 | Murata et al. .............. 428/517 |
| 5,343,655 A | 9/1994 | Miyakawa et al. ........... 49/441 |
| 5,414,961 A | 5/1995 | Tessier ......................... 49/441 |
| 5,415,822 A | 5/1995 | Cook ........................... 264/171 |
| 5,424,019 A | 6/1995 | Miyakawa et al. ..... 264/177.17 |
| 5,424,108 A | 6/1995 | Whetstone ................... 428/99 |
| 5,441,685 A | 8/1995 | Miyakawa et al. ......... 264/148 |
| 5,447,671 A | 9/1995 | Kato et al. .................. 264/148 |
| 6,286,841 B1 * | 9/2001 | Foy et al. .................... 277/651 |

FOREIGN PATENT DOCUMENTS

| | | |
|---|---|---|
| DE | 4441852 A1 | 11/1994 |
| EP | 0900680 A1 | 3/1999 |
| FR | 2585799 A1 | 8/1985 |
| FR | 2633361 A1 | 6/1988 |
| GB | 1083667 | 9/1967 |
| GB | 2036840 A | 12/1978 |

* cited by examiner

Primary Examiner—Deborah Jones
Assistant Examiner—Alicia Chevalier
(74) Attorney, Agent, or Firm—Brian B. Shaw, Esq.; Stephen B. Salai, Esq.; Harter, Secrest & Emery LLP

(57) ABSTRACT

A weatherseal for releasably engaging a movable panel such as a glass panel in a motor vehicle is disclosed. The weatherseal has a substrate with an elongate recess. The recess includes a floor adjacent at least one groove. An adhesive is disposed in a portion of the recess, wherein excess adhesive is captured in the groove. A contact layer is bonded to the adhesive. Thus, the contact layer is accurately located with respect to the weatherseal and variances in adhesive volume are accommodated by the groove.

19 Claims, 4 Drawing Sheets

WEATHERSEAL HAVING A SUBSTRATE WITH AN ADHESIVE OVERFLOW CONTAINMENT GROOVE

FIELD OF THE INVENTION

The present invention relates to motor vehicle seals such as door, deck lid, hood-to-cowl, sunroof and window seals, and more particularly, to weatherseals for releasably contacting a panel, wherein the weatherseal includes a contact surface connected to a substrate by an adhesive, the adhesive being partially captured within an at least one predefined groove.

BACKGROUND OF THE INVENTION

The use of movable panels, and particularly glass panels in motor vehicles has presented numerous sealing problems since their first use. These problems include the durability of the seal, the ability of the seal to selectively release from the glass and permit a sliding association of the seal and the glass, as well as the ability of the seal to preclude the migration of air, water and noise between the seal and the glass.

In addition, the advances in motor vehicle design have created further demands on seals including varying profile configurations and enhanced performance. Economic demands require more efficient production of the seals including reduced material costs, quality demands require special seal configurations.

A number of plastic and elastomeric compounds including thermoplastic and thermosetting materials and combinations thereof have been employed in prior seal designs. The seals are designed to reduce the migration of air, water and noise across the seal as well as provide reduced resistance to separation of the glass from the seal. Various contact surfaces have been employed to reduce the retention force between the glass and the seal. The contact surfaces include there are two grooves spaced apart by a distance corresponding to the desired width of the contact layer. The grooves are selected to retain the adhesive within a predefined area of the substrate. The grooves control the location of the adhesive and reduce contamination of an adjacent exposed surface. Specifically, the grooves provide a reservoir for retaining an excess of adhesive such that a desired minimum amount of adhesive can be applied without spilling or over-filling the predefined area of the substrate. In addition, the grooves provide a relatively straight and clean line when the contact layer, such as flocking, is applied.

In a further configuration, a groove is intermediate the contact layer and the exposed surface of the weatherseal, wherein an adhesive is intermediate the contact layer and the substrate and at least partially disposed within the groove.

The present invention also contemplates an elongate recess extending along the weather seal, wherein at least one groove is located in the recess. The recess is sized to receive the contact layer. The groove may be centrally located in the recess. Alternatively, the groove may be disposed along an edge of the recess. In a further configuration, a retaining rib is located adjacent the groove and extends along the length of the groove. The retaining rib enhances the retention of a predetermined volume of adhesive in a desired location prior to any over flow migrating to the adjacent groove.

DETAILED DESCRIPTION OF THE PREFERRED EMBODIMENTS

Figure 1:
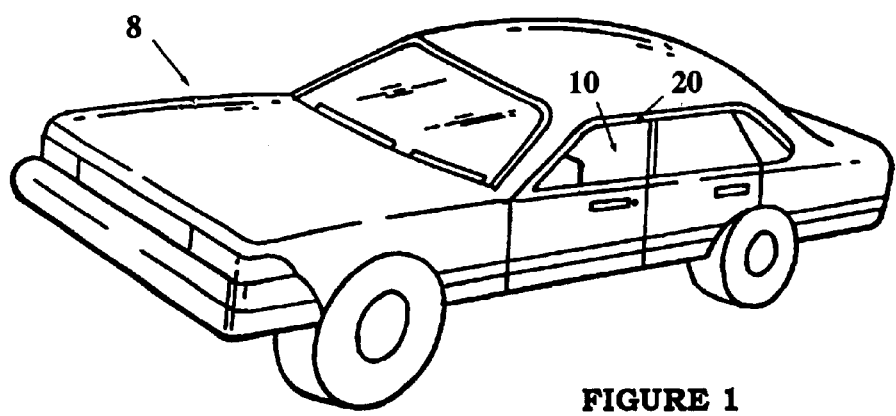
FIG. 1 is a perspective view of a motor vehicle incorporating the present invention.

Referring to FIG. 1, the present invention may be configured as a weatherseal 20 for selectively contacting a movable panel 10 such as a glass window or door in an automobile 8.

The term weatherseal 20 is intended to encompass any type of seal such as door, deck lid, hood-to-cowl, sunroof and window seals including belt line and glass guidance components. The panel 10 may be any of a variety of materials and does not limit the present invention. For example, the panel 10 may be glass, metal or a composite, which is painted, surface treated or bare. In the operating environment, the panel 10 is brought repeatedly into and out of engagement with the weatherseal 20. The engagement of the panel 10 and the weatherseal 20 may result from motion of the panel, the weatherseal or a combination of both.

Figure 3:
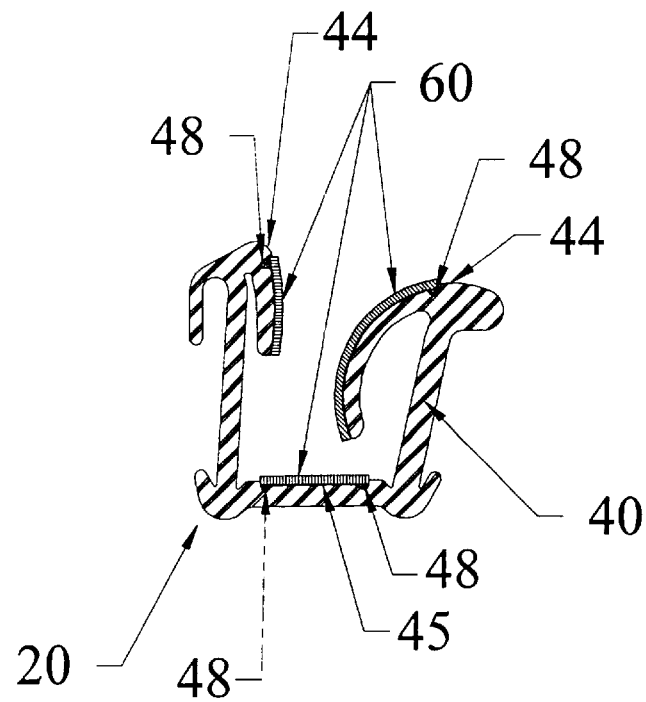
FIG. 3 is a cross sectional view of a weatherseal incorporating the over flow containment grooves.
Figure 4:
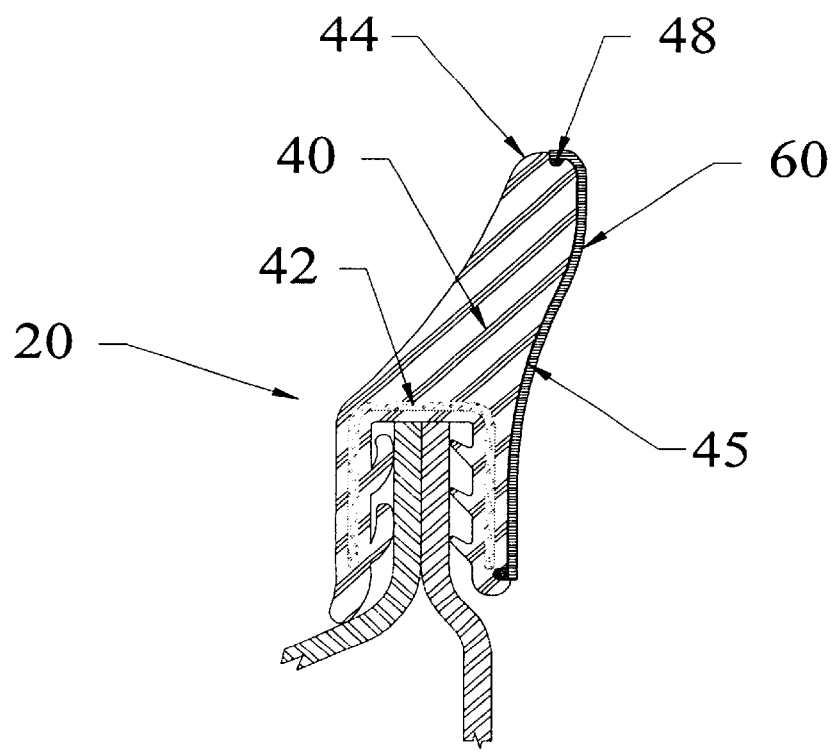
FIG. 4 is a cross sectional view of a configuration of the seal located as a belt line seal incorporating the present invention.

The weatherseal 20 may be employed as a glass guidance component including window channels (FIGS. 2 and 3) and a belt line seal (FIG. 4).

In each configuration, the weatherseal 20 includes a substrate 40, an adhesive 50 and a contact layer 60. The substrate 40 extends the length of the weatherseal 20 and supports the adhesive 50 and the contact layer 60.

Figure 2:
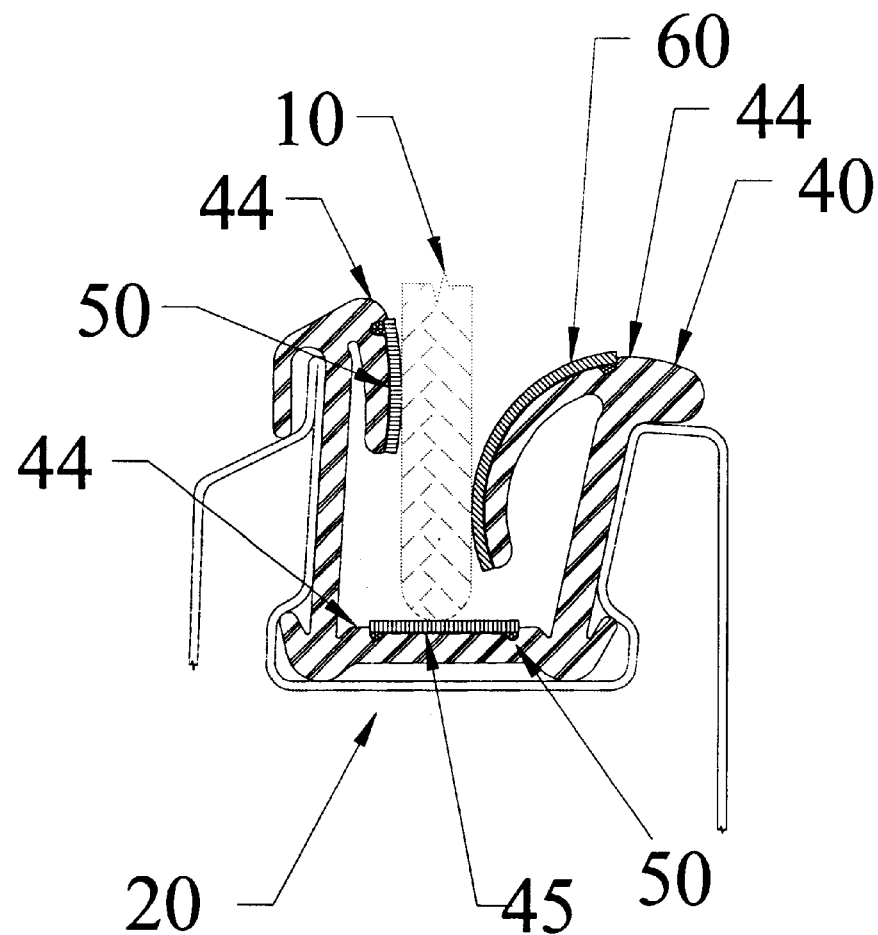
FIG. 2 is a cross sectional view of a weatherseal incorporating the present invention engaged with a panel.

It is understood the weatherseal 20 may be employed with further components, such as a frame or channel into which the weatherseal is disposed such as shown in FIG. 2. In a further configuration, additional layers may be formed or connected to the contact layer 60.

The Substrate

The substrate 40 may be formed by any of a variety of materials and in a variety of configurations such as "U", "C", "J" or other profiles. For the purpose of the description, the cross section profile is shown in FIG. 2 as a "U" shaped channel having a plurality of glass contacting areas. It is understood the substrate 40 may have a finger shape as shown in the belt line configuration of FIG. 4.

Referring to FIG. 4, the substrate 20 may include reinforcing members 42 such as stamped metal, wire carriers, or longitudinal reinforcing elements, depending upon the intended operating environment and materials of construction.

The substrate 40 can be formed from any resilient material such as a rubber, for example, natural rubber, styrene-butadiene rubber (SBR), ethylene-propylene rubber (EPR) or ethylene-propylene-diene-monomer (EPDM) rubber, or any combinations thereof. EPDM is preferred and exhibits good compression set, durability and resistance to weathering. The substrate 40 may be formed by a combination of materials to provide different rigidities along the length of the substrate. For example, portions of the substrate 40 may be formed of thermoplastic, TPE or thermoset materials, or may be formed with varying carriers. Further, the substrate 40 may be a laminate, composite or layered structure.

It is contemplated the substrate 40 may be attached or incorporated into a frame for attachment to the motor vehicle 8. The frame may be formed of a relatively rigid material such as thermoplastics or thermoplastic elastomers (TPE). Alternatively, the frame may be formed of metal or even a portion of the vehicle itself. In those configurations employing TPE, the TPE portions of the carrier can be formed from a number of different plastic materials, for example, thermoplastics and TPEs. TPEs are commercially available in several different brands and types. Each type can be obtained in different grades having different properties such as, hardness, tensile strength, compression, elongation, thermal stability and colorability. Selection of the appropriate TPE for a particular application depends on a suitable combination of such properties. Types of TPEs which are particularly useful for the channel seal are the styrenic block copolymers, rubber-polyolefin blends, thermoplastic alloys, thermoplastic ionomers, thermoplastic polyurethanes, polyvinyl chlorides and blends thereof.

As shown in FIG. 2 and 4–7, the substrate 40 includes an exposed surface 44 and a recess 45. The recess 45 is generally bounded by the exposed surface 44. That is, the recess 45 is at a lower elevation than the exposed surface 44. The extent of the difference in elevation is partially determined by the intended contact layer 60, the adhesive 50 (or the material of the contact layer) and the intended operating parameters of the weatherseal 20. The recess 45 functions to retain the adhesive 50 prior to bonding with the contact layer 60.

Figure 5:
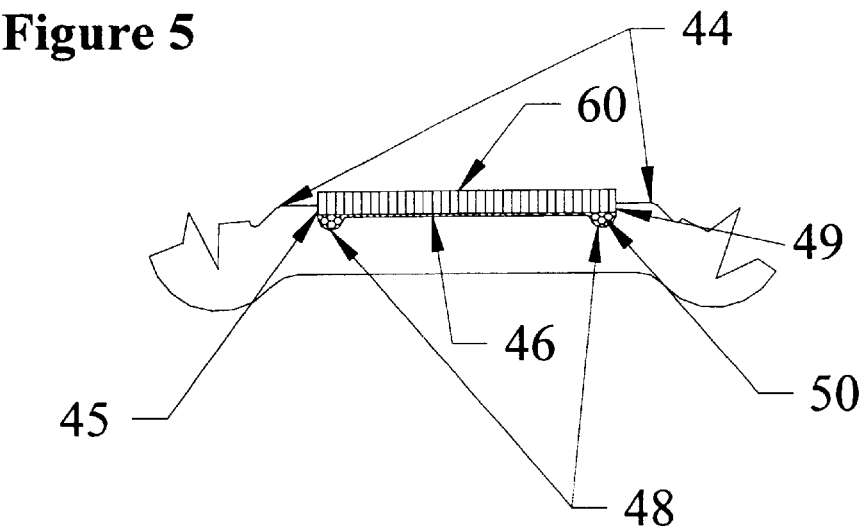
FIG. 5 is an enlarged cross sectional schematic view of the over flow containment grooves showing a generally perpendicular intersection of the grooves and the adjacent exposed surface.
Figure 6:
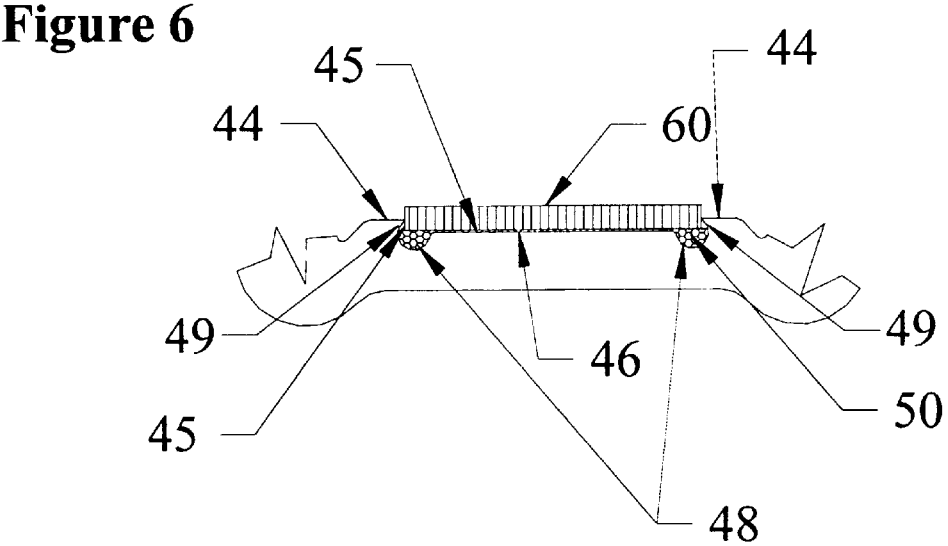
FIG. 6 is an enlarged cross sectional schematic view of the over flow containment grooves showing an overhang or lip at the intersection of the grooves and the adjacent exposed surface.
Figure 7:
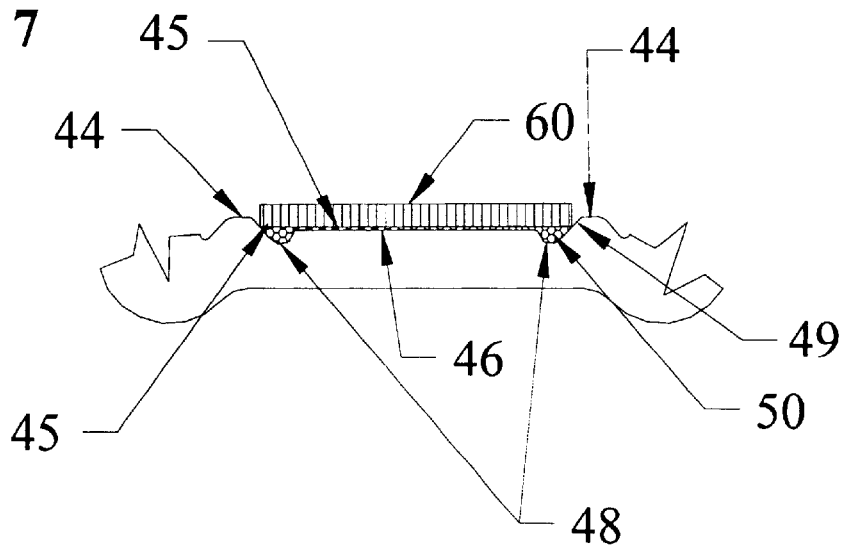
FIG. 7 is an enlarged cross sectional schematic view of the over flow containment grooves showing an inclined intersection of the adjacent exposed surface and the grooves.

In this configuration, the recess 45 includes at least one groove 48, and preferably a floor 46 and a pair of lateral grooves. The grooves 48 extend below the elevation of the floor 46. The depth of the grooves 48 with respect to the floor 46 is at least partially determined by the intended adhesive 50, the contact layer 60 (or the material of the contact layer) and the intended operating parameters of the weatherseal 20. The floor 46 is generally laterally bounded by the elongate lateral grooves 48. Thus, one edge of the groove 48 is bounded by the exposed surface 44 along one edge and the remaining edge of the groove is bounded by the floor 46. The intersection of the grooves 48 and the exposed surface 44 may also be advantageously selected. Specifically as shown in FIG. 5 and 6, the intersection 49 may include an overhang or lip 51 to assist in retaining the adhesive 50 (the material of the contact layer 60) within the recess 45. Alternatively, the intersection 49 of the gutter 48 and the exposed surface 44 may be defined by a radius. It is understood, the recess 45 may include only a single gutter 48 wherein the floor 46 is bounded by a groove 48 along one side and the exposed surface 44 along the remaining side as shown in FIGS. 2 and 3.

As shown in FIG. 5, the intersection 49 of the groove 48 and the adjacent exposed surface 44 may be substantially perpendicular. That is, a right angle is formed between the groove 48 and the exposed surface 44. Alternatively, as shown in FIG. 6, the intersection 49 of the groove 48 and the exposed surface 44 may include the overhang or lip 51. The overhang 51 may generally occlude a portion of the groove 48. Further, referring to FIG. 7, it is understood the intersection 49 of the groove 48 and the exposed surface 44 may be an inclined surface.

Preferably, the substrate 40 is formed by a process that allows relative control of the location and profile of the recess, including the straight line edge of the grooves 48 (intersection of the exposed surface area and the recess).

The floor 46 may have any of a variety of cross sectional profiles. That is, the floor 46 may be substantially planar as it extends between the exposed surface portion. Alternatively, the floor 46 may be concave or convex between the grooves 48.

It is understood the recess 45 may be substantially limited to the groove 48, such that the groove is intermediate the contact layer 60 and the exposed surface 44. Thus, the floor 46 may be above, at or below the elevation of the adjacent exposed surface 44, wherein the groove 48 is intermediate the floor and the exposed surface.

As the contact layer 60 is disposed in the recess 45, the profile of the recess generally determines the corresponding profile of the contact layer. Preferably, the exposed surface 44 of the substrate 40 extends above any adhesive 50 in the recess 45. Further, it is contemplated the floor 46 may have differing depth along the length of the weatherseal 20. Depending upon the desired performance characteristics of the weatherseal 20, the floor 46 may be very slightly recessed to provide enhanced flexibility. Alternatively, the floor 46 may be relatively deep to provide enhanced sealing performance.

In addition, depending upon the configuration of the recess 45, the resulting contact layer 60 may provide noise suppression, vibration reduction and accommodate variations in the panel. That is, the recess 45 may be constructed to assist in accommodating variations in the panel 10, reducing vibration of the panel or the motor vehicle and reducing noise transmission across the weatherseal interface.

Figure 8:
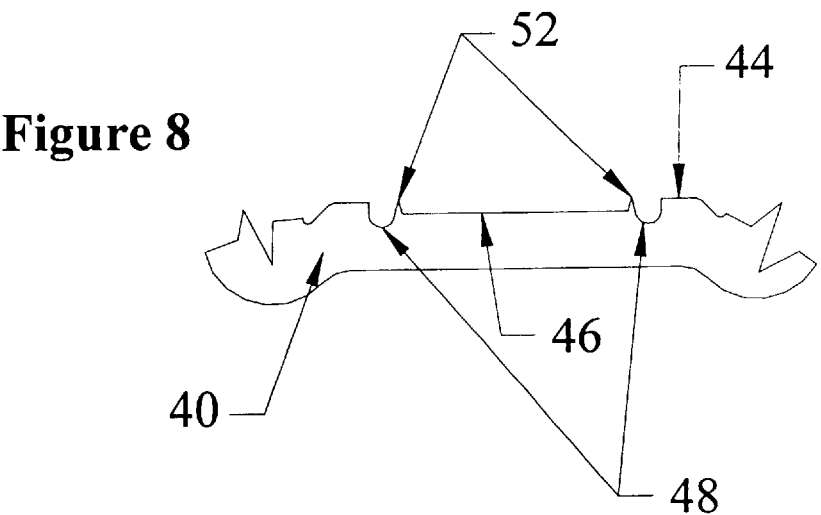
FIG. 8 is an enlarged cross sectional schematic view of a configuration having retaining ribs extending adjacent the over flow containment grooves.

Referring to FIG. 8, the present invention also contemplates a retaining rib 52 adjacent the groove 48. Generally, the retaining rib 52 is located in the recess 45 such that the floor 46 extends along one side and the groove 48 extends along the remaining side. The retaining rib 52 may have any of a variety of cross sectional profiles including, but not limited to triangular, hemispherical or elliptical.

Figure 9:
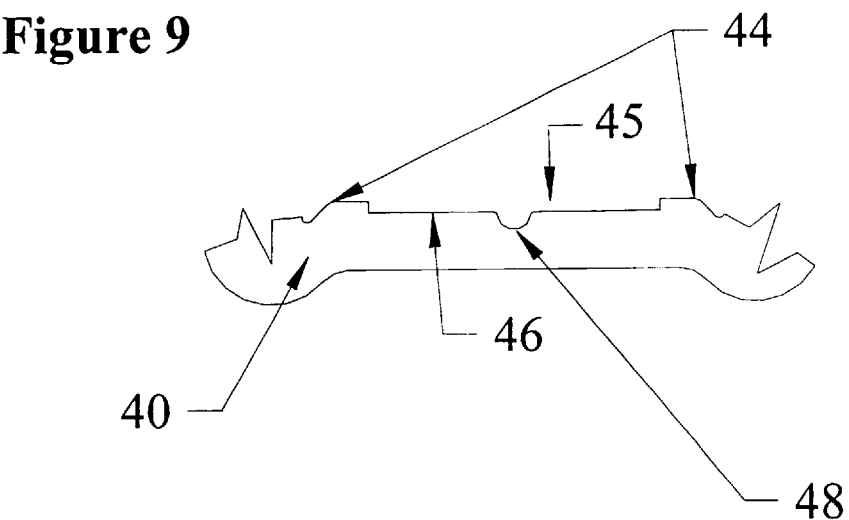
FIG. 9 is an enlarged cross sectional schematic view of a configuration having the over flow containment groove located intermediate edges of the recess.

As shown in FIG. 9, the groove 48 may be located centrally or off center in the recess 45. That is, the floor 46 may transition directly to the exposed surface 44 and the groove 48 is spaced from each transition. The groove 48 still provides a reservoir for retaining an excess of adhesive 50. It is understood a plurality of grooves 48 may be employed in the recess 45, wherein the grooves may have a varying cross section along their length. Additionally, the grooves 48 may each have a unique cross section, depending upon the desired configuration of the weatherseal 20.

Figure 10:
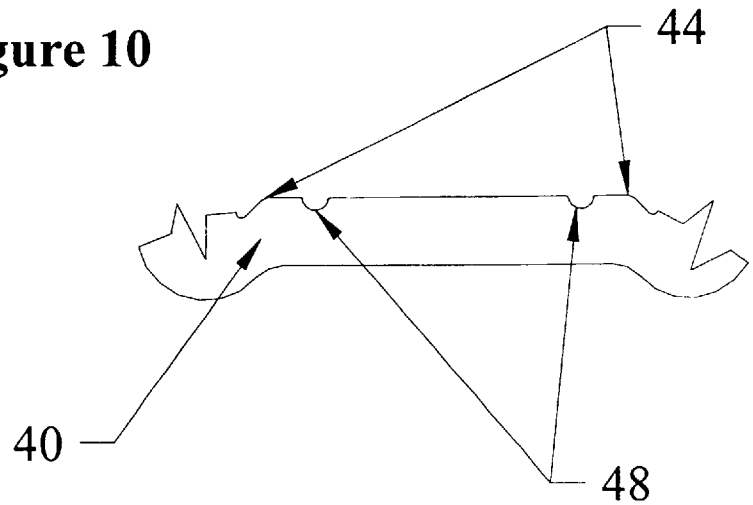
FIG. 10 is an enlarged cross sectional schematic view of a configuration employing the over flow containment grooves independent of a recessed floor.

Referring to FIG. 10, the weatherseal 20 may be formed to include a pair of spaced grooves 48 separated by a portion of the exposed surface 44. That is, a groove 48 may be employed without forming the recess 45. It is further contemplated that a retaining rib 52 may be located on either side of the groove 48. That is, the retaining rib 52 may be between the contact layer 60 and the groove 48, or the groove may be between the retaining rib and the contact layer.

The cross sectional profile of the recess 45 can be used in receiving, locating and distributing the adhesive 50 and hence the contact layer 60. As the eye generally follows the interface of the grooves 48 and the exposed surface 44, the present invention provides a clean line appearance.

Adhesive

The adhesive 50 is disposed within the boundaries of the recess 45. The adhesive 50 is selected to bond the contact layer 60 to the substrate 40. Although the adhesive 50 may be any of variety of commercially available adhesives, it has been found advantageous to employ either a one or a two part adhesive. A suitable adhesive 50 is a urethane based, two part adhesive such as CHEMLOK® sold by Lord Corporation.

The adhesive 50 is applied to at least a portion of the recess 45. The contact layer material and form of the recess 45 are selected in combination with the volume of the adhesive 50 such that migration of the adhesive beyond the intersection of the groove 48 and the exposed surface 44 is substantially precluded. That is, travel of the adhesive 50 beyond the groove 48 is precluded. The grooves 48 define a sufficient volume such that during manufacturing, tolerances in the volume of adhesive 50 per linear foot of substrate 40 are accommodated by the corresponding volume of the grooves. Thus, the grooves 48 capture any adhesive 50 overflow from the floor 46 and prevent the adhesive from flowing over onto the exposed surface 44. As the location and linear parameters of the grooves 48 can be well controlled, the resulting location of the adhesive 50 is well controlled.

In a preferred configuration, the recess 45 and the adhesive 50 are selected to form a relatively straight sight line along a length of the weatherseal 20.

Contact Layer

The contact layer 60 is disposed on the adhesive 50 retained in the recess 45. The contact layer 60 may be any of a variety of materials such as flock or a ribbon of additional material such as lubricious plastics including thermoplastics and thermosetting materials as well as combinations thereof. Further, the contact layer 60 may include felt, pile, slip coatings or combinations thereof. It is understood the contact layer 60 encompasses any surface material that may be adhered to the adhesive 50 in the recess 45.

The recess 45, the adhesive 50 and the contact layer 60 are selected to be compatible with sufficient adhering characteristics to substantially preclude unintended separation during manufacture, installation or operation of the weatherseal 20.

Manufacture

Preferably, the substrate 40 is extruded and the recess 45 is formed in predetermined portions of the substrate. In view of the extruding process, the recess 45 may be accurately located on the substrate. In addition, the extruding process allows the recess 45 to be intermittent or varying in profile along the length of the weatherseal 20. Further, the location and cross sectional profile of the groove 48 may be accurately located. The retaining ribs 52 are also readily formed by an extrusion process.

An adhesive applicator is aligned to dispose the adhesive 50 along the intended area of bonding between the contact layer 60 and the substrate 40, including the groove 48 and if employed, the recess 45. The area over which the adhesive 50 is applied and the flow rate (volume) of the adhesive applied depends upon a number of factors including the viscosity of the adhesive, the binding nature of the adhesive, the volume of the grooves 48 and the residence time prior to application of the contact layer 60. The application rate of the adhesive 50 and residence time are selected to substantially coat the intended area of contact between the contact layer 60 and the substrate 40, typically defined by the floor 46, without excessive adhesive pooling in the grooves 48, leaving less than a sufficient volume of adhesive coating the floor.

An excess of the adhesive 50 in the recess 45 creates significant adhesive retention problems as well as added materials costs. Therefore, it is advantageous to employ as close to the minimum required amount of the adhesive 50 necessary. The adhesive application rate is set so that fluctuations in the application of the adhesive 50 tend to insure at least the minimum amount of the adhesive is applied. The grooves 48 are sized to capture any excess adhesive 50, particularly the fluctuation induced excess, and prevent the adhesive from flowing onto the exposed surface 44.

The retaining rib 52 functions to keep a volume of the adhesive 50 in the area of intended contact between the substrate 40 and the contact layer 60, prior to the adhesive migrating into the groove 48. That is, the retaining rib 52 acts as a dam or weir to regulate the volume of adhesive 50 for bonding to the contact layer 60.

The contact layer 60 is then applied to the adhesive 50 in the recess 45, and particularly the floor 46. The contact layer 60 may be sized to bond to the adhesive 50 in the grooves 48 and hence to the substrate 40. The contact layer 60 may be flock and applied as known in the art to the adhesive 50. Alternatively, the contact layer 60 may be a ribbon of relatively lubricious material that adheres to the adhesive 50. As the adhesive 50 may be formed in the relatively straight sight line, the contact layer 60 will be correspondingly straight edged.

In the configuration of the weatherseal 20 having at least one groove 48 immediately adjacent a portion of the exposed surface 44, the adhesive 50 coats the relative area of the exposed surface 44 and any excess adhesive is collected in the groove 48.

The present invention offers the benefit of employing a die to locate the recess 45, including the grooves 48 with closer tolerances through the extrusion process. The recess 45 is located and sized so that the adhesive 50 may be applied to ensure coverage, with reduced leakage and capture of excess by the grooves 48. In contrast to prior substrate configurations that have employed ridges or ribs to locate the adhesive, the present configuration not only locates the adhesive, but also accommodates variations in adhesive volume.

While the invention has been described with reference to preferred embodiments, it will be understood by those skilled in the art that various changes may be made and equivalents may be substituted for elements thereof without departing from the scope of the invention. In addition, many modifications may be made to adapt a particular material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A weatherseal for releasably engaging a panel on a motor vehicle, comprising:
   (a) a substrate having an elongate adhesive retaining first groove defined by a first portion of the substrate extending along a first edge of the first groove and a second portion of the substrate extending along a second edge of the first groove, the first groove having a longitudinal dimension and a transverse dimension;
   (b) an adhesive disposed on the first portion of the substrate and in the first groove to at least partially fill the first groove; and
   (c) a contact layer bonded to the adhesive,
   (d) the first groove sized to preclude migration of the adhesive to the second portion of the substrate.

2. The weatherseal of claim 1, further comprising a second groove spaced from the first groove to bound the adhesive and the contact layer by the first groove and the second groove.

3. The weather seal of claim 2, wherein the substrate includes a recessed floor intermediate the first groove and the second groove.

4. A weatherseal for contacting a panel on a motor vehicle, comprising:
   (a) an elongate substrate having a longitudinal dimension and a shorter transverse dimension, the substrate including a raised land area, a recessed land area and an elongate adhesive retaining groove extending along the longitudinal dimension, the groove bounded along a first edge by the raised land area, and along a second edge by the recessed land area;
   (b) an adhesive disposed in a portion of the recessed land area and the groove, wherein the groove has a sufficient volume to substantially preclude migration of the adhesive onto the raised land area; and
   (c) a contact layer bonded to the adhesive.

5. The weatherseal of claim 4, further comprising an elongate adhesive retaining second groove extending along the longitudinal dimension.

6. A weatherseal for a motor vehicle, comprising:
   (a) a substrate having a first land area and an adjacent recessed land area separated by a step down shoulder;
   (b) an elongate adhesive retaining groove in the recessed land area; and
   (c) an adhesive in the recessed land area and a portion of the groove, the adhesive at least partially bounded by the step down shoulder.

7. The weatherseal of claim 6, further comprising a second groove in the substrate, a portion of the recess extending between the grooves.

8. The weatherseal of claim 6, further comprising a contact layer bonded to the adhesive.

9. A weatherseal for a motor vehicle, comprising:
   (a) a substrate having a recessed floor and an elongate adhesive retaining first groove in the recessed floor;
   (b) a retaining rib adjacent the first groove, the retaining rib extending along a length of the first groove;
   (c) an adhesive in the recessed floor and a portion of the first groove; and
   (d) a contact layer bonded to the adhesive;
   (e) the first groove sized to preclude migration of the adhesive from going out of the recessed floor.

10. The weatherseal of claim 9, wherein the substrate includes an elongate adhesive retaining second groove spaced from the first groove, to locate at least a portion of the recessed floor between the first groove and the second groove.

11. The weatherseal of claim 10, wherein the recessed floor is entirely intermediate the first groove and the second groove.

12. A weatherseal for a motor vehicle, comprising:
   (a) a substrate having an elongate adhesive retaining first groove the first groove having a first edge defined by a first adjacent portion of the substrate and a second edge defined by a second adjacent portion of the substrate;
   (b) an adhesive in the first groove and on the first adjacent portion of the substrate; and
   (c) a contact layer connected to the substrate,
   (d) the first groove being sized to preclude migration of the adhesive from the first groove to the second adjacent portion of the substrate.

13. The weatherseal of claim 12, wherein the substrate includes an adhesive retaining second groove spaced from the first groove and the contact layer is bordered by the first groove and the second groove.

14. A weatherseal for a motor vehicle, comprising:
   (a) an elongate substrate having a longitudinal dimension and an elongate adhesive retaining first groove;
   (b) a first retaining rib adjacent the first groove, the first retaining rib extending along a length of the first groove;
   (c) an adhesive on a first portion of the substrate adjacent a first edge of the groove and in a portion of the first groove, at least one of the first groove and the first retaining rib sized to preclude, migration of the adhesive to a second portion of the substrate adjacent a second edge of the first groove; and
   (d) a contact layer bonded to the adhesive.

15. The weatherseal of claim 14, further comprising a second retaining rib spaced from the first retaining rib to locate the adhesive on the substrate between the first retaining rib and the second retaining rib.

16. The weatherseal of claim 14, further comprising an adhesive retaining second groove.

17. The weatherseal of claim 14, further comprising a second retaining rib spaced from the first retaining rib and an adhesive retaining second groove.

18. The weatherseal of claim 17, wherein the first groove and the second groove are intermediate the first retaining rib ad the second retaining rib.

19. The weatherseal of claim 17, wherein the first retaining rib and the second retaining rib are intermediate the first groove and the second groove.

* * * * *